United States Patent
Khosla et al.

(10) Patent No.: US 8,634,982 B2
(45) Date of Patent: Jan. 21, 2014

(54) SYSTEM AND METHOD FOR RESOURCE ALLOCATION AND MANAGEMENT

(75) Inventors: Deepak Khosla, Camarillo, CA (US); David Fuciarelli, Goodyear, AZ (US); David L Ii, Manassas, VA (US)

(73) Assignee: Raytheon Company, Waltham, MA (US)

( * ) Notice: Subject to any disclaimer, the term of this patent is extended or adjusted under 35 U.S.C. 154(b) by 644 days.

(21) Appl. No.: 12/543,665

(22) Filed: Aug. 19, 2009

(65) Prior Publication Data

US 2011/0046837 A1 Feb. 24, 2011

(51) Int. Cl.
*G05D 1/00* (2006.01)

(52) U.S. Cl.
USPC ............... 701/25; 701/23; 701/528; 701/533; 701/410; 701/420; 712/233

(58) Field of Classification Search
USPC ............. 701/25, 26, 528, 533, 410, 411, 420; 712/233
See application file for complete search history.

(56) References Cited

U.S. PATENT DOCUMENTS

| | | |
|---|---|---|
| 6,259,988 B1 | 7/2001 | Galkowski et al. |
| 6,497,169 B1 | 12/2002 | Khosla |
| 6,704,692 B1 | 3/2004 | Banerjee et al. |
| 6,934,615 B2 | 8/2005 | Flann et al. |
| 7,047,861 B2 | 5/2006 | Solomon |
| 7,162,199 B1 | 1/2007 | Glickstein et al. |
| 7,236,861 B2 | 6/2007 | Paradis et al. |
| 7,248,952 B2 | 7/2007 | Ma et al. |
| 7,451,023 B2 | 11/2008 | Appleby et al. |
| 7,603,212 B2 | 10/2009 | Ariyur et al. |
| 7,606,659 B2 | 10/2009 | Erignac |
| 7,757,595 B2 | 7/2010 | Khosla et al. |
| 7,769,491 B2 | 8/2010 | Fukuchi et al. |
| 8,013,781 B2 | 9/2011 | Stockmann |
| 8,186,589 B2 | 5/2012 | Ben Asher et al. |
| 8,199,643 B2 | 6/2012 | Hirsch et al. |
| 8,244,469 B2 | 8/2012 | Cheung et al. |
| 2004/0193349 A1 | 9/2004 | Flann et al. |
| 2006/0074557 A1 | 4/2006 | Mulligan et al. |
| 2006/0200333 A1 | 9/2006 | Dalal et al. |
| 2007/0021880 A1 | 1/2007 | Appleby et al. |
| 2007/0162405 A1 | 7/2007 | Parunak et al. |
| 2007/0225912 A1 | 9/2007 | Grush |
| 2007/0244673 A1 | 10/2007 | Khosla et al. |

(Continued)

OTHER PUBLICATIONS

Hohzaki et al., Optimal strategy of route and look for the path constrained search problem with reward criterion, 1997, European Journal of Operational Research, 100, 236-249.*

(Continued)

*Primary Examiner* — Thomas Black
*Assistant Examiner* — Sara Lewandroski
(74) *Attorney, Agent, or Firm* — Renner, Otto, Boisselle & Sklar, LLP (57) ABSTRACT

To improve the scheduling and tasking of sensors, the present disclosure describes an improved planning system and method for the allocation and management of sensors. In one embodiment, the planning system uses a branch and bound approach of tasking sensors using a heuristic to expedite arrival at a deterministic solution. In another embodiment, a progressive lower bound is applied to the branch and bound approach. Also, in another embodiment, a hybrid branch and bound approach is used where both local and global planning are employed in a tiered fashion.

19 Claims, 8 Drawing Sheets

(56) References Cited

U.S. PATENT DOCUMENTS

| | | |
|---|---|---|
| 2007/0288132 A1 | 12/2007 | Lam |
| 2007/0288156 A1 | 12/2007 | Neff et al. |
| 2008/0086236 A1 | 4/2008 | Saito et al. |
| 2008/0235318 A1 | 9/2008 | Khosla et al. |
| 2008/0250875 A1 | 10/2008 | Khosla et al. |
| 2009/0157233 A1 | 6/2009 | Kokkeby et al. |
| 2010/0017046 A1 | 1/2010 | Cheung et al. |
| 2010/0017115 A1 | 1/2010 | Gautama |
| 2010/0198514 A1 | 8/2010 | Miralles |
| 2010/0250319 A1 | 9/2010 | Khosla et al. |
| 2011/0004581 A1 | 1/2011 | Schmidt et al. |
| 2011/0029239 A1 | 2/2011 | Okude et al. |
| 2011/0040750 A1 | 2/2011 | Safra et al. |
| 2011/0046837 A1 | 2/2011 | Khosla et al. |

OTHER PUBLICATIONS

Eagle et al., An optimal branch-and-bound procedure for the constrained path, moving target search problem, 1990, Operations Research, vol. 38, No. 1.*

Laburthe et al., Multiresolution on-line path planning for small unmanned aerial vehicles, 2008, American Control Conference.*

Gaudiano et al., Swarm Intelligence: a New C2 paradigm with an application to control of swarms of UAVs, 2003, 8th ICCRTS Command and Control Research and Technology Symposium.*

Shiina, Integer programming model and exact solution for concentrator location problem, 2000, Journal of the Operations Research Society of Japan, vol. 43, No. 2.*

Singh et al., Efficient Planning of Informative Paths for Multiple Robots, 2007, IJCAI'07, pp. 2204-2211.*

Hohzaki et al., Optimal strategy of route and look for the path constrained search problem with reward criterion, 1997, European Journal of Operational Research 100; pp. 236-249.*

Davidson, A fast pruning algorithm for optimal sequence alignment, 2001, Proceedings of the 2nd IEEE International Symposium on Bioinformatics & Engineering.*

Ignall et al., Application of the branch and bound technique to some flow-shop scheduling problems, 1964, Contract No. NSF-GP 2729.*

Laburthe et al., Salsa: A language for search algorithms, 1998, LNCS, 1520, pp. 310-324.*

Pesant et al., A view of local search in constraint programming, 1996, In Proceedings of CP '96, pp. 353-366.*

Sing et al., Efficient planning of informative paths for multiple robots, 2007, IJCAI'07, pp. 2204-2211.*

Shiller et al., On computing the global time-optimal motions of robotic manipulators in the presence of obstacles, 1991, IEEE.*

Ben-Aymed et al., Computational difficulties of bilevel linear programming, 1988, Univ. of Illinois.*

Jung et al., Multiresolution on-line path planning for small unmanned aerial vehicles, 2008, American Control Conference.*

Onodera, H. et al., "Branch-and-bound Placement for Building Block Layout", Design Automation Conference, 28th ACM/IEEE, (1991), pp. 433-439.

Fukunage, K. et al., "A Branch and Bound Algorithm for Computing k-Nearest Neighbors" IEEE Transactions on Computers, (1975), vol. C-24, Issue 7, pp. 750-753.

Haffner, S. et al., "Brand and Bound Algorithm for Transmission System Expansion Planning Using a Transportation Model", Generation, Transmission and Distribution, IEEE Proceedings, (2000), vol. 147, Issue 3, pp. 149-156.

Chhetri, A.S. et al., "Nonmyopic Sensor Scheduling and it's Efficient Implementation for Target Tracking Applications" EURASIP Journal on Applied Signal Processing, vol. 2006, Article ID 31520, pp. 1-18.

Earl, M.G. et al., "A Decomposition Approach to Multi-vehicle Cooperative Control", [retrieved online], <http://arxiv.org/abs/cs.RO/0504081.

Feng, Z.G. et al., "Branch and Bound Method for Sensor Scheduling in Discrete Time", Journal of Industrial and Management Optimization, (2005), vol. 1, pp. 499-512.

Kearns, Michael, et al., "A Sparse Sampling Algorithm for Near-Optimal Planning in Large Markov Decision Processes", Uncertainty and Probabilistic Reasoning, pp. 1324-1331.

Kocsis, Levente, et al., "Bandit Based Monte-Carlo Planning", Computer and Automation Research Institute of the Hungarian Academy of Sciences, Budapest, Hungary.

Bellingham, John Saunders, "Coordination and Control of UAV Fleets using Mixed-Integer Linear Programming", Massachusetts Institute of Technology, Sep. 2002, pp. 1-116.

Rasmussen SJ and Shima T (2006). Branch and Bound Tree Search for Assigning Cooperating UAVs to Multiple Tasks. Proceedings of the 2006 American Control Conference Minneapolis, Minnesota, USA, Jun. 14-16, 2006. 2171-2176.

Reinefeld A and Marsland TA (1994). Enhanced Iterative-Deepening Search. IEEE Transactions on Pattern Analysis and Machine Intelligence. 16(7): 701-710.

Undeger C and Polat F (2010). Multi-agent real-time pursuit. Auton Agent Multi-Agent Syst (2010) 21:69-107.

Chung TH, Kress M and Royset JO (2009). Probabilistic Search Optimization and Mission Assignment for Heterogeneous Autonomous Agents. Robotics and Automation, 2009. ICRA '09. 939-945.

Grundel DA (2005). Searching for a moving target: optimal path planning. Networking, Sensing and Control, 2005 IEEE. 867-872.

Gualandi S and Tranchero B (2007). Concurrent constraint programming-based path planning for uninhabited air vehicles.v Unattended/Unmanned Ground, Ocean, and Air Sensor Technologies and Applications VI. Edited by Carapezza, Edward M.Proceedings of the SPIE, vol. 5417, pp. 176-185.

Shetty VK, Sudit M and Nagi R (2006). Priority-based assignment and routing of a fleet of unmanned combat aerial vehicles. Computers & Operations Research 35 1813-1828.

Waharte S, Symington A and Trigoni N (2010). Probabilistic Search with Agile UAVs. IEEE International Conference on Robotics and Automation. May. 2840-2845.

Huang, Chien Y., "Real-Time Automated Decision-Making in Advanced Airborne Early Warning Systems", 1990, IEEE, pp. 434-439.

* cited by examiner

SYSTEM AND METHOD FOR RESOURCE ALLOCATION AND MANAGEMENT

TECHNICAL FIELD OF THE INVENTION

The technology of the present disclosure relates generally to the scheduling and tasking one or more sensor resources to optimize information collection.

BACKGROUND

One type of sensor is an unmanned areal vehicle (UAV) that flies over an area of interest (AOI) to collected information. Scheduling and tasking UAVs to follow a flight pattern to optimize information collection is a complex combinatorial problem.

SUMMARY

To improve the scheduling and tasking of sensors, the present disclosure describes an improved planning system and method for the allocation and management of sensors. In one embodiment, the planning system uses a branch and bound approach of tasking sensors using a heuristic to expedite arrival at a deterministic solution. In another embodiment, a progressive lower bound is applied to the branch and bound approach. Also, in another embodiment, a hybrid branch and bound approach is used where both local and global planning are employed in a tiered fashion.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

1. Introduction

This document describes systems and techniques for long-term, closed-loop management and planning of distributed, heterogeneous sensor resources for intelligence, surveillance and reconnaissance (ISR). The disclosed techniques may be used to optimize sensor resource allocation, scheduling and tasking, in near real time, to meet user information collection goals.

Figure 1:
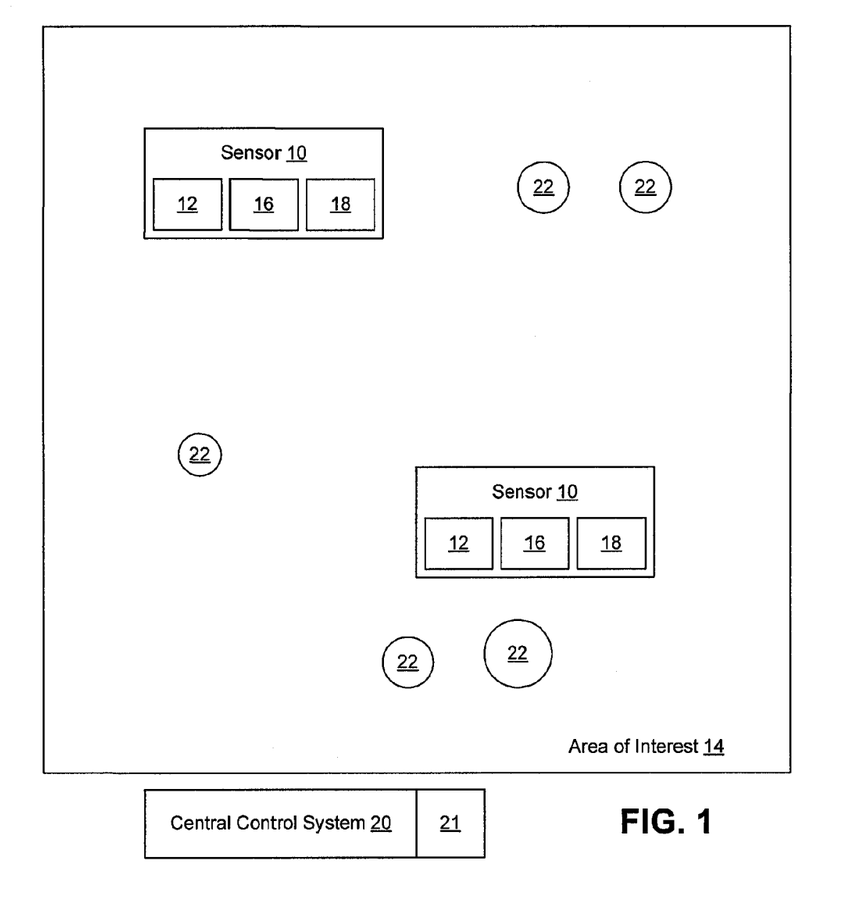
FIG. 1 is a schematic representation of a sensor system.

FIG. 1 illustrates an exemplary operational context in which the described resource allocation techniques may be used. FIG. 1 illustrates a sensor system that includes sensors 10. By way of example, the sensors 10 are unmanned areal vehicles (UAVs) that include equipment 12 for conducting ISR and that are configured to fly over an area of interest (AOI) 14. But it will be understood that the sensors 10 may be other types of sensors, such as manned aircraft, vehicles, robots, persons, etc.

Each sensor 10 may include a control assembly 16 for carrying out the functions described herein. The control assembly 16 may interface with a communications assembly 18 that establishes operative communications with other sensors 10 and/or a central control system 20. It will be understood that an intervening network or other equipment may be present in the communication paths between and among the sensors 10 and the central control system 20.

The control assembly 16 may include a processor for executing logical instructions in the form of computer code and a memory representing a computer readable medium for storing an operating system, computer code, data and so forth. The memory may be, for example, a magnetic, optical and/or electrical data storage device, and/or an assembly of memory devices that have volatile and/or non-volatile data storage capabilities. The processor may interface with the memory so as to form a computer system in which the memory is used for long term data storage and system memory.

Also, or in the alternative, the described functions may be carried out by the central control system 20. In some embodiments, the described functions may be distributed between the sensors 10 and the central control system 20, or one may serve as a backup for the other. The central control system 20 may be configured as a computer system with an interface to communications equipment 21 that establishes communications with the sensors 10. Accordingly, the central control system 20 may include a processor for executing logical instructions in the form of computer code and a memory representing a computer readable medium for storing an operating system, computer code, data and so forth. The memory may be, for example, a magnetic, optical and/or electrical data storage device, and/or an assembly of memory devices that have volatile and/or non-volatile data storage capabilities. The processor may interface with the memory so as to form a computer system in which the memory is used for long term data storage and system memory.

Therefore, the functionality described in this document may be embodied as an apparatus in the form of a computer readable medium that stores a program and the program may be executed by a processor. For the sake of brevity, actual computer code listings are omitted. However, the algorithmic and logical flow of such a program will be understood from the following description and appended figures.

According to some embodiments, the systems and methods involve a hierarchical approach of sensor tasking that include near real-time planning on a global level and a local level and to provide an optimized sensor management plan over large ISR areas and long-term look-ahead horizons. The techniques may be applied to manage distributed, heterogeneous resources, where a resource may be a sensor, machine or even a human.

In military surveillance and tracking applications, system performance goals are often varied and complex. Critical decision making at various levels is usually done by human operators. Such decision making may include tasks such as assessing the current situation based on an analysis of a large amount of information, determining what needs to be done to remedy or improve the current situation to meet system goals, and determining appropriate actions, including sensor tasking, based on current the situation. At all levels, the operator has to evaluate a large number of possible options in a short amount of time and may be overwhelmed by the analysis. This can result in inefficient utilization of resources and poor system performance. Therefore, the described techniques have been developed to provide an automated approach to replace or assist the operator in his or her decision making process.

The disclosed techniques are well suited for any netted system comprising of multiple, distributed, heterogeneous sensors and communication resources. Using the disclosed techniques, it is possible to manage resources in such a system so as to achieve maximal performance, where the performance is expressed as an objective function.

The techniques are well suited to defense and military applications that involve allocating and scheduling resources to satisfy one or more time critical objectives. Specific examples include military planning and dynamic sensor management, as may be found in advanced combat systems, netted sensors, homeland security applications, future combat systems, unmanned systems, autonomous systems, missile defense systems, and so forth. In both planning and dynamic resource management scenarios, limited time-critical resources need to be allocated to optimize one or more objectives. The techniques may be extended and applied to any system that makes decisions based on collected information to control resources, and need not be applied to defense and military applications.

Aspects of the disclosed systems and methods involve branch and bound techniques to solve the combinatorial problems involved with sensor management tasks. The branch and bound techniques may be used reduce the effective size of the search space and provide a deterministic solution. The disclosed branch and bound techniques use efficient heuristics that allow for effective near real-time planning of distributed, heterogeneous resources over large areas and long-term look-ahead horizons, but with low computational and memory costs. In comparison, various meta-heuristic methods, such as genetic algorithms and particle swarm optimization, may give very different solutions for the same initial and starting conditions.

2. Sensor Management Parameters

2(A). Area of Interest (AOI)

As indicated, there may be a known area of interest (AOI) 14. The AOI 14 may have a size, or area A, and the AOI 14 may be specified using a known geographic location and boundaries. The AOI 14 may contain multiple targets 22 for investigation by the sensors 10. The number and location of the targets 22 may be initially unknown.

For purposes of sensor 10 tasking, the AOI 14 is divided into a grid having discrete grid cells. In the illustrated examples, the AOI 14 is rectangular and the grid cells are squares. It will be understood that the AOI 14 and the grid cells may have other shapes. The grid may be I grid cells wide and J grid cells long, resulting in an I×J grid. Therefore, each grid cell location may be denoted as $g_{i,j}$ where $(i, j) \forall i=1, 2 \ldots I, j=1, 2 \ldots J$. For simplicity, it may be assumed that each grid cell has the same size a, with A=(I)(J)(a).

2(B). Prior Intelligence

Prior intelligence may be available as a target probability (or likelihood) map for the AOI with a probability value specified for each grid cell. The target probability for a grid cell $g_{i,j}$ may be denoted $v_{i,j}$. Also, the sum of all probability values may equal one as expressed by $$\sum_{i=1}^{I}\sum_{j=1}^{J} v_{i,j} = 1.$$

In the described formulation, the "information" that can be collected in a grid cell is proportional to the grid cell's target probability. Thus, higher $v_{i,j}$ values indicate more information that should be collectable from the corresponding grid cell $g_{i,j}$.

2(C). Sensor Model

There are a total of K sensors 10 that may collect information from the AOI 10. In the case where the sensors 10 are UAVs, the UAVs may fly over the AOI 14 and collect information therefrom. In one embodiment, the initial location of each sensor 10 is assumed to be directly over the AOI 14 and its position relative to the AOI 14 is known. For this embodiment, it may be assumed that the sensors 10 fly at a fixed vertical height over the AOI so as to travel in a two-dimensional (2D) plane (e.g., in-plane, x-y motion).

In the x-y coordinates, each sensor may fly from the center of one grid cell to any of its neighboring grid cells. In addition, each sensor also may stay at its current location. Sensor movement may be restricted to a discrete number of move types. Two sets of exemplary move types are contemplated, but others may be possible. The first exemplary set assumes that the sensors 10 may move in any of the four cardinal directions, including north, south, east, and west. The second exemplary set assumes that the sensors 10 may move in any of the eight ordinal directions, including north, northeast, east, southeast, south, southwest, west, and northwest.

Each sensor may be assumed to have a fixed speed and the time taken to move from one grid cell to the center of an adjacent grid cell depends on the distance traversed. For simplicity, diagonal and lateral moves are treated identically, even though the actual distance traveled when making a diagonal move is 2.5 times greater than a lateral move. This approximation is made so that the future movement action of multiple sensors 10 may be considered jointly. In other embodiments, this simplification may be removed.

2(D). Observation Model

An assumption is made that sensors 10 may move continuously, but only make observations at discrete time steps (e.g., every quarter second, every half second, every second, every ten seconds, every minute, and so forth). In one embodiment, the planning may be updated at every time step. At each time-step, each sensor observes the grid cell directly beneath itself, collecting a certain amount of information (or "data") from the grid cell. The amount of information collected in one observation is dependent on the collection rate, or probability of detection value, denoted by c of the sensor 10. Thus, if grid cell $g_{i,j}$ is observed by a sensor with a collection rate c, then the amount of information collected in one observation of that grid cell is $v_{i,j}$*c. For convenience, it may further be assumed that each sensor 10 has the same c, but other embodiments need not make this assumption. If $g_{i,j}$ is observed $n^{i,j}$ times, then the information collected is $$v_{i,j} c^{n_{i,j}}.$$

2(E). Objective Function

The sensor search management may manage the K sensors 10 in order to maximize the rate of information collection from the AOI 14. As indicated, the information available at each grid cell is proportional to the target probability value for that grid cell. Sensor management involves determining the order of observations (e.g., the grid cells to which the sensors should move and observe) in order to maximize information collection. At each time-step, each sensor observes the grid directly beneath itself, collecting a certain amount of data from the grid and reducing the grid cell's target probability value (or available information). Therefore, the sensor management objective function may be defined using equation 1 as the sum of the target probability values of all the grid cells.

$$O = \sum_{i,j} v_{i,j} c^{n_{i,j}} \quad \text{Eq. 1}$$

In equation 1, $v_{i,j}$ is the initial target probability value of the grid cell at coordinate (i, j), c is the sensor collection rate (which is defined as the probability of detection), and $n_{i,j}$ is the number of observations of the grid cell at (i, j). Accordingly, optimized sensor management minimizes the objective function.

A Naïve brute-force sensor management method would simply look for the set of actions with the highest value across the entire search space, which is of size $m^{dK}$, where m is the number of moves, d is the look-ahead depth, and K is the number of sensors. Assuming that a single sensor starts in the middle of an environment where I×J represents a grid that is 78 grid cells by 78 grid cells in size, and the sensors can move in the eight ordinal directions, the search space would include $8^{39}$ (or $1.7 \times 10^{35}$) action combinations. Such a large number action combination is well beyond the capability of field deployable computers to find a sensor tasking solution in any reasonable amount of time.

3. Sensor Management

The following sections describe efficient branch and bound techniques to solve the above-described sensor management challenges. The disclosed branch and bound techniques intelligently prioritize the search space and provide deterministic solutions to sensor tasking. In comparison, various meta-heuristic methods (e.g., genetic algorithms, particle swarm optimization, etc.) could give very different solutions for the same initial and starting conditions.

3(A). Beginning Branch and Bound Function

The disclosed sensor management techniques may commence with a beginning branch and bound function. As will be described in later sections, modifications and extensions are added to the beginning branch and bound function.

The initial state of the system is represented by a root node that includes the probability map of the AOI 14 and the current positions of all of the sensors 10. This root node is used to generate a number of successor nodes, each of which represents the state of the system after executing a certain sensor action combination. Successors are then generated for each successor node, and this continues until the tree reaches a predetermined search depth d.

A path from the root node to each leaf node is known as a branch. Branches of the joint action space are pruned by eliminating action combinations that cannot beat a current best score, in even the most ideal circumstances. These ideal circumstances are quantified via a heuristic, which is a routine that calculates an absolute maximum amount of gain given a state and remaining look-ahead depth. It is expected that the disclosed heuristic will execute with ease using conventional computer resources of UAVs and/or the central control system 20. Also, the disclosed approach will return tasking solutions that will be close to the solutions that one would obtain by performing an exhaustive search of the possible solution space.

One embodiment of the beginning branch and bound function is set forth in pseudocode listing 1, appearing below. The function may start with an auxiliary function that generates successor nodes from a node undergoing evaluation (e.g., the root node).

---
Pseudocode Listing 1
---
Auxiliary Functions
   GenerateSuccessors
Algorithm BranchAndBound(depth, root)
   current_best := 0
   Successors := GenerateSuccessors(root)
   while |Successors|
     if first successor's depth is less than the look-ahead depth
       if first successor's g + h value is greater than the current best
         Successors += GenerateSuccessors(first successor)
       end if
     else
       if first successor's g value is greater than the current best
         current_best := first successor's g value
       end if
     end if
     delete first successor
   end while
end algorithm

---

The heuristic of the beginning branch and bound function attempts to find the most promising path through the AOI 14 to acquire as much information as possible through the predetermined look ahead depth. The acquisition of information using sensors 10 may be compared to the "scooping up" of sand. For example, if the sensors have scoops to pick up available sand in the cell grids, one would want to be able to pick up as much sand as possible in the available number of steps. In this example, the entire AOI 14 may have a total amount of sand that may be picked up and this sand is unevenly distributed in the grid cells. Under this analogy, the beginning branch and bound function would determine which path to take to pick up as much sand as possible in a number of moves corresponding to the look ahead depth.

In pseudocode listing 1 for the foregoing beginning branch and bound function, the value g represents a best solution value for the path being investigated in that iteration of the function. Each iteration investigates what value is gained from going forward from a successor node corresponding to the iteration. Using the sand analogy, g would be the total amount of sand that would be picked up if one were to take a certain path from the node for that iteration. The value h represents a heuristic value as given by equations 2a and 2b appearing below. Therefore, for information collection, the sum of g and h predicts the maximum amount of information gathered using the sensors (or, under the analogy, the maximum amount of sand scooped) for the branch corresponding to the iteration of the function.

$$h = c \sum_{i=1}^{d} \text{best}(G_d) \qquad \text{Eq. 2a}$$

$$G_{d+1} = \text{update}(G_d, \text{bestpos}(G_d)), G_1 = G_{initial} \qquad \text{Eq. 2b}$$

As indicated, c is the probability of detection and d is the look ahead depth. G represents the total amount of gathered information through the series of steps.

The heuristic for the beginning branch and bound is specifically composed for sensor management. The heuristic functions by selecting the best d number of grid cells (or a number of grid cells equaling the look ahead depth) within progressively increasing radii centered at the sensor's current position. As each square is selected, the search grid is updated at the square's location. This process is given mathematically by equations 2a and 2b.

Figure 2A:
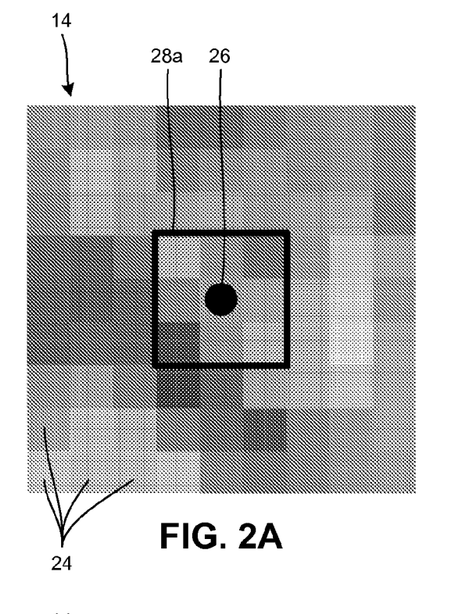
FIGS. 2A through 2D are representative schematic plots of a search grid in which sensor planning is carried out using a beginning branch and bound function.
Figure 2B:
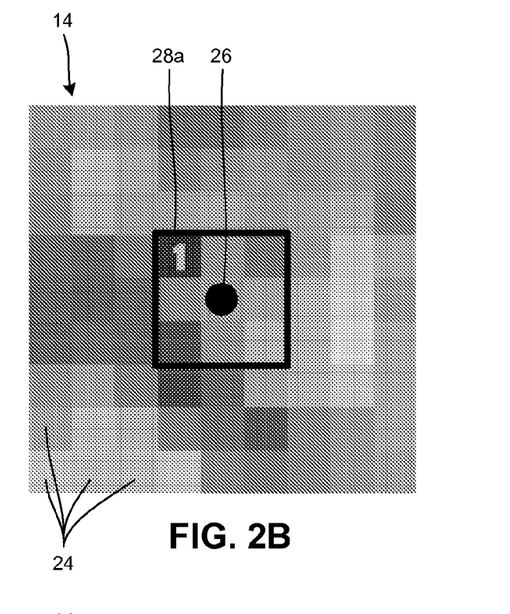
Figure 2C:
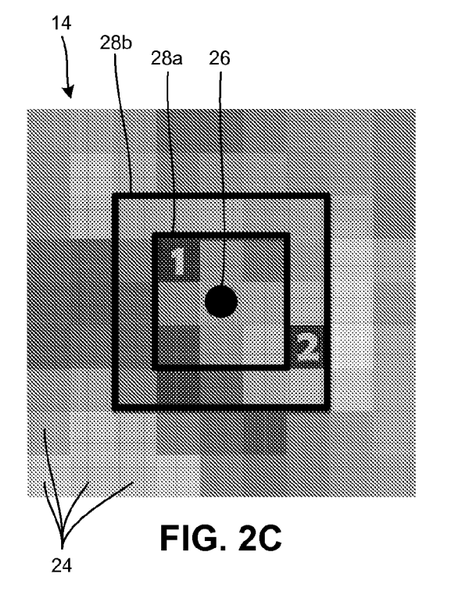
Figure 2D:
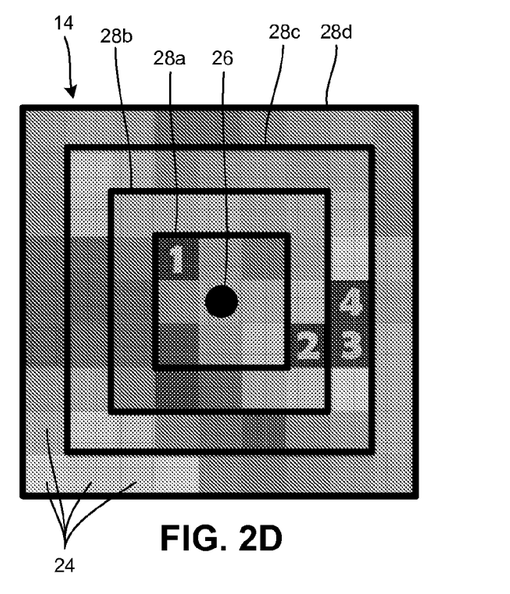

With additional reference to FIGS. 2A through 2D, the technique followed by the heuristic is shown graphically. FIG. 2A shows initial conditions of a search area (e.g., the AOI 14), FIG. 2B shows the search area after one move, FIG. 2C shows the search area after two moves, and FIG. 2D shows the search area after four moves.

Starting with FIG. 2A, the AOI 14 is a nine by nine grid of grid cells 24. A starting point 26 is represented by a circle, which is in the center of the AOI 14 for purposes of an example. The distance that the sensor 10 may move in the step undergoing analysis is represented by a step outline 28, and this distance may be referred to as a search distance. In the example given by FIGS. 2A through 2D, the sensor may move in the eight ordinal directions or remain stationary. Therefore, in one step, the sensor 10 may be in any of the nine grid cells 24 within the step outline 28a.

Of the grid cells 24 within the step outline 28 for the corresponding step, the heuristic identifies which grid cell 24 would provide the most value if the sensor traveled to that grid cell 24. In the analogy of scooping sand, this would be the cell that contains the most sand that could be scooped in the corresponding step. For example, in FIG. 2B a cell grid 24 is identified with the number "1" to represent the grid cell 24 that may be reached in one move and that would provide the most value.

The heuristic continues until the look ahead depth is reached. For instance, in FIG. 2C, a step outline 28b is shown for a second step. As indicated, the step outline 28 for all steps is determined from the starting location 26 for the sensor 10 and not successively from the grid cell 24 that represented the best move in the prior step. This aspect of the heuristic means that the function is carried out without regard to the feasibility of the moves from step to step. For example, using the step outline 28b for the second move, the grid cell 24 with the most value is identified with the number "2." This grid cell may be reached in two moves from the starting location 26, but may not be reached in one move the grid cell identified with the number "1."

The approach continues until the number of search steps corresponds to the predetermined look ahead depth. In the representative example of FIG. 2D, step outlines 28c and 28d are shown for third and forth steps. The grid cells within the step outline 28c may be reached within three moves from the starting location 26 and the grid cells within the step outline 28d may be reached within four moves from the starting location 26. The grid cells 24 with the highest move values for these steps are respectively shown with the number "3" and the number "4." In this illustration, it happens that the grid cell 24 labeled with the number "3" may be reached in one move from the grid cell 24 labeled number "2" and that the grid cell 24 labeled with the number "4" may be reach in one move from the grid cell 24 labeled number "3." As indicated, this need not be the case.

As will be apparent, the foregoing heuristic does not involve branching and no selection depends on the previous selection. Since actions selected by the heuristic do not have to be adjacent to each other, the set of actions may not be feasible by actual sensor movement in the corresponding number of steps. However, the heuristic will return a higher gain value than any set of "only feasible" actions, or equal to a set that includes only feasible actions when all moves in the solution identified by the heuristic happen to be feasible. Gain value is the amount of information collected (or, in the sand example, the amount of sand picked up) divided by the time it took to collect that information. Simulation results have determined that this heuristic is effective to prune over 95 percent of the search space.

3(B). Progressive Lower Bound Branch & Bound (PLB3) Function

In order to further improve the pruning efficiency of the basic branch and bound function described in the preceding section, a progressive lower bound heuristic may be used and will be referred to as a progressive lower bound branch & bound (PLB3) function. At the start of sensor 10 tasking, the beginning branch and bound function may be used to solve for the sensor movements and subsequent movements are determined using the PLB3 function.

The PLB3 function incrementally reuses previous solution information for faster computation of future movements. In one embodiment, the beginning branch and bound function is user to determine a solution for a limited number of time steps (e.g., the first time step or a number of time steps equaling the look ahead depth) and solutions for all subsequent time steps are determined using the PLB3.

At each time step, a solution for sensor tasking is determined for the predetermined look ahead depth. Therefore, tasking actions for the look ahead depth are known. The current $G_d$ value corresponds to the best chain of actions through the look ahead depth as determined by prior sensor tasking iteration. The current $G_d$ value may be used in setting an initial lower bound for the next iteration of the branch and bound function for the next time step.

Considering that the branch and bound function iterates at each time-step and only the number of actions corresponding to the look-ahead depth are evaluated, setting the initial lower bound for time-steps after the first time step (when the beginning branch and bound function is carried out) may include: 1) subtracting the value of the first action (or the value of moving from the current node to the next node) from the total value of the chain of actions (or the current $G_d$), and 2) adding the value of a greedy action taken at the end of the chain of actions. This "seeds" the branch and bound algorithm with an initial lower bound value greater than 0, which allows for earlier pruning.

Figure 3A:
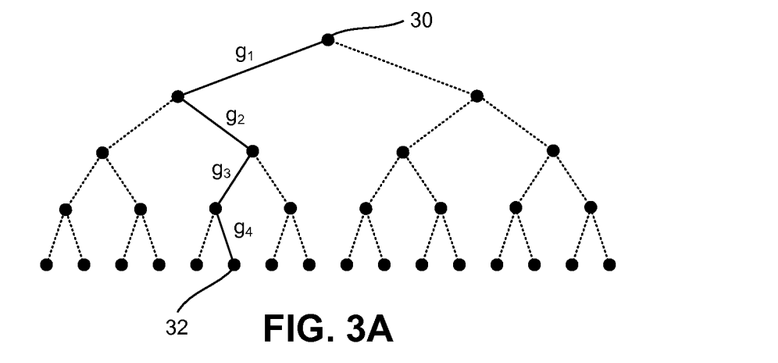
FIG. 3A is a representative node tree.
Figure 3B:
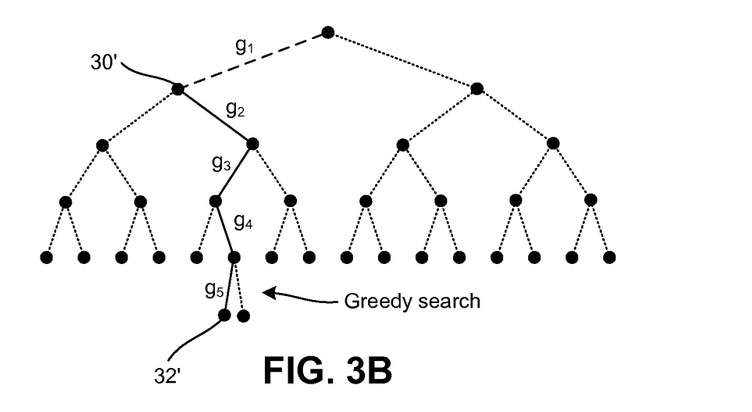
FIG. 3B is the representative node tree of FIG. 3A that been updated for use in determining an initial lower bound value.

This operation is graphically represented by FIGS. 3A and 3B. FIG. 3A represents an exemplary solution determined by the beginning branch and bound function or a prior iteration of the PLB3 function. Starting at a current node 30 the path to an end node 32 at look ahead depth d is known. For simplicity, the illustrated example has a look ahead depth of four and each node has two possible branches stemming therefrom. The path from the current node 30 to the end node 32 is shown in solid lines, whereas the alternative branches are shown in dashed lines. Each move in the path has an associated value (labeled $g_1$, $g_2$, $g_3$ and $g_4$) that, when summed, equals $G_d$.

FIG. 3B shows the determination of the initial lower bound by performing a greedy search of the moves available from the end node 32 to determine a node (labeled 32') following the end node 32. Then, the initial lower bound is determined by summing the values in the path from the node (labeled 30') following the current node 30 to the node 32' following the end node 32. In the example, the lower bound is the sum of the values along this path, or the sum of $g_2$, $g_3$, $g_4$ and $g_5$. This is computationally equivalent to adding $g_5$ to $G_d$ and subtracting $g_1$, as described above.

One embodiment of the PLB3 function is set forth in pseudocode listing 2 appearing below. The function may start with an auxiliary function that generates successor nodes from a node undergoing evaluation and an auxiliary function that generates the initial lower bound by using the previous "best" to set the initial lower bound.

Pseudocode Listing 2

```
Auxiliary Functions
   GenerateSuccessors
   ProgressiveLowerBound
Algorithm BranchAndBoundWithPLB(previous_best_actions)
   current_best := ProgressiveLowerBound(previous_best_actions)
   Successors := GenerateSuccessors(root)
   while |Successors|
      if first successor's depth is less than the look-ahead depth
         if first successor's g + h value is greater than the current best
            Successors += GenerateSuccessors(first successor)
         end if
      else
         if first successor's g value is greater than the current best
            current_best := first successor's g value
            best_actions += first successor's action
         end if
      end if
   end while
end algorithm
```

A difference between PLB3 function and the beginning branch and bound function is that any action chains that were previously marked as the best action chain and share the same first action as the current best action chain are saved and used for sensor tasking. This is done because the additional action chains might potentially yield a greater lower bound, and calculating the adjusted lower bound for an action chain is computationally inexpensive compared to the branch and bound operation itself.

Figure 4:
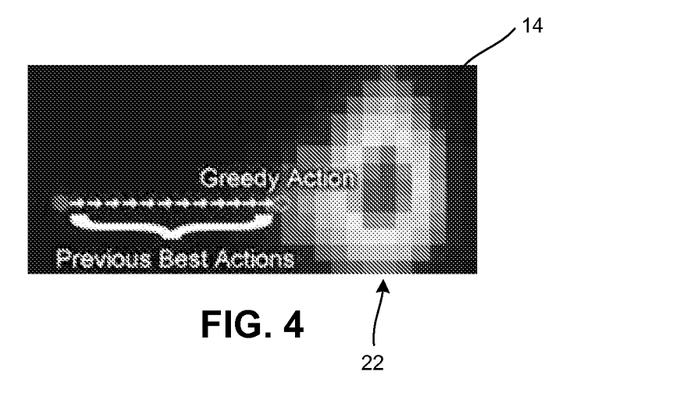
FIG. 4 is an exemplary spatial representation of a progressive lower bound branch and bound (PLB3) function.

This is illustrated in FIG. 4 where a target 22 is illustrated in a lighter color background than surrounding areas of the AOI 14. More specifically, FIG. 4 is a spatial representation of the PLB3 function. The white arrows represent the actions that make up the action chain determined at the previous time-step. The dark arrow represents the best single action taken after the last action of the pre-determined action chain. If a sensor is en route to an area of high value (e.g., a target 22), it is likely the future actions will remain on this path. Therefore, in the exemplary representation of FIG. 4, it is unlikely that the first 12 actions (shown by the white arrows) will change as the sensor gets closer to the target 22. The effect of using the value of the previous action chain is to preselect the remaining moves and potentially eliminate the rest of the tree very quickly.

Even assuming this large pruning rate of the PLB3 function, the number of actions in the joint action space to completely cover an AOI with a grid size of 78 by 78 grid cells is about $10^{29}$, which is still incomputable in a reasonable period of time given the available resources. One way to reduce the computational complexity is to reduce the look-ahead depth to a value that reduces the action space to a level for which modern computers can return a solution in a reasonable amount of time. For a single sensor with 8 possible moves, an exemplary look-ahead value is about 12 time-steps. Unfortunately, only a tiny fraction of the AOI would be explored by the sensor under this approach (e.g., $24^2/78^2 = 9\%$). Using the PLB3 function with a relatively short look-ahead depth may be able to optimize local tasking performance. But searching performance over the entire AOI (assuming that the AOI is relatively large compared grid cells reachable in the look ahead depth).

3(C). Hybrid Local-Global Branch and Bound (HLGBB) Function

To improve search performance for the entire AOI 14, a global look-ahead capability may be added to the sensor management operation. This may be accomplished by performing a global branch and bound function (also referred to as a global planner) and a local branch and bound function (also referred to as a local planner). The global branch and bound function may generate general destinations within the AOI 14 for the sensors 10. In the case of UAVs, the general destinations result in the establishment of a coarse flight path. The local branch and bound function operates to determine the exact flight path (e.g., slight deviations from the coarse flight path) so that the sensor acquires maximum information while travelling along the coarse flight path and travels to a high value portion in the area of the general destination.

In one embodiment, the global branch and bound function involves conducting the beginning branch and bound function and the PLB3 function using a coarse grid size for the AOI 14 and the local branch and bound function involves conducting the beginning branch and bound function and the PLB3 function using a fine grid size for the AOI 14. As an example, the fine grid may be a grid of 78 grid cells by 78 grid cells and the coarse grid may be a grid of 12 grid cells by 12 grid cells. In one embodiment, the ratio of the number of grid cells in the coarse grid to the number of grid cells in the fine grid may be in the range of about 1:4 to about 1:10.

The approach of using a global planning function and a local planning in this fashion may be referred to as a hybrid local-global branch and bound (HLGBB) function or as a multi-tiered branch and bound function since the hybrid approach includes multiple levels, or tiers, of sensor planning. One tier may be on a global basis to plan gross movement and another tier may be on a local level to plan fine movement along the gross movement plan.

In the disclosed approach, the global branch and bound function is carried out for the current position of the sensors to determine a best possible move in a general direction on the coarse grid. Planned movement through the coarse grid would naturally run through plural corresponding grid cells from the fine grid. The disclosed approach includes carrying out the local branch and bound function for the sensors under the constraint that the grid cells from the fine grid cells considered by the local branch and bound function are reachable from the path determined by the global function within the look-ahead depth for the local function. The sensors may then be tasked to follow the solution determined by the local function. In effect, local planning is superimposed on global planning.

The look ahead depth for the global function may be different from the look ahead depth of the local function. For instance, the local look ahead depth for the local function may be about two to about ten times longer than the look ahead depth for the global function.

More detailed operation of the hybrid planning approach will now be described. In one embodiment, the global branch and bound function mosaics the AOI 14 into a grid that has lower resolution than the local grid. This enables the beginning branch and bound function and the PLB3 function of the global branch and bound function to cover the entire AOI 14 with a smaller look-ahead depth than the local branch and bound function. For a single sensor in an example where the coarse grid is 12×12 and the fine grid is 78×78, the global planning for the space is manageable with a look-ahead depth of less than 12. For more sensors, the coarse grid could be made coarser to compensate for a larger branching factor.

One embodiment of the HLGBB function is set forth in pseudocode listing 3 appearing below.

| Pseudocode Listing 3 |
| --- |
| Algorithm LocalGlobalManager (local_depth, global_depth)<br>  global_root := GenerateGloableRootNode (UndecidedSensors)<br>  GlobalActions :=GloableBranchAndBound (global_depth, global_root)<br>  SendActionsToSensors (GlobalActions)<br>  UndecidedSensors −= GetDedicatedSensors (GlobalActions)<br>  local_root := GenerateLocalRootNode (UndecidedSensors)<br>  LocalActions := LocalBranchAndBound (local_depth, local_root)<br>  SendActionsToSensors (LocalActions)<br>end algorithm |

Figure 5A:
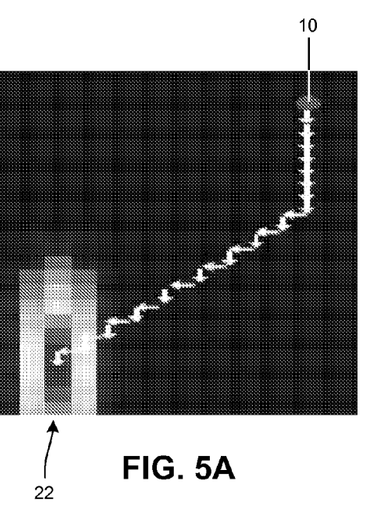
FIG. 5A is an exemplary flight path using cardinal directions.
Figure 5B:
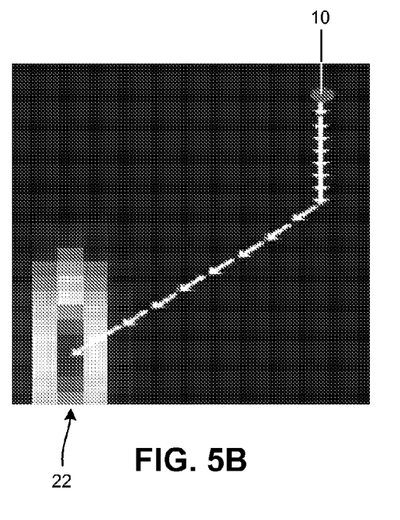
FIG. 5B is an exemplary flight path using ordinal directions.

For purposes of hybrid planning of sensor movement to a grid cell from the coarse grid, the sensors may move in the cardinal directions or, if allowed, the ordinal directions along the grid cells of the fine grid. An endpoint for a coarse grid cell is defined as the fine grid cell within the corresponding coarse grid that serves as the final destination for a global move. As part of the planning, movement to a global grid cell's endpoint may be accomplished by taking the shortest path from the current position to the endpoint, with the constraint that all moves are allowable under the local planning FIG. 5A illustrates an exemplary path when sensor moves include the cardinal directions and FIG. 5B illustrates an exemplary path when sensor moves include the ordinal directions.

To plan a move for the global branch and bound function, each coarse grid cell is assigned a value. In one embodiment, the value of each coarse grid cell is deemed to be the value in travelling to the endpoint of the corresponding coarse grid cell. These values may be determined for each coarse grid reachable in the global look ahead depth, including the coarse grid cell in which the sensor is currently located.

Figure 6:
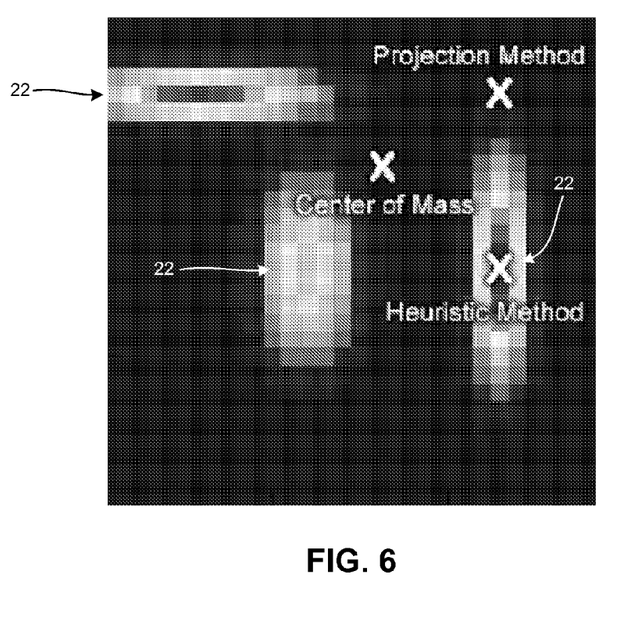
FIG. 6 shows representative endpoints for a global move determined using various techniques.

With additional reference to FIG. 6, there are several ways to select the fine grid cell that serves as the endpoint for a potential global move. Exemplary techniques include a center of mass technique and a projections technique. As shown in FIG. 6, however, the center of mass and projection techniques may produce endpoints that are in areas of little or no value within the corresponding coarse grid cell. This may make a coarse grid cell with high value targets unattractive during the planning process.

Therefore, an alternative approach is to use the fine grid cell identified by the local branch and bound function as the endpoint. This endpoint is identified in FIG. 6 by the designation "heuristic method." Under this approach, the fine grid cell with the highest local planning value resulting from the above-described heuristic returns an endpoint that suitably represents the overall value offered by a particular coarse grid cell and under the local look-ahead depth.

The endpoints considered during the global branch and bound function may correspond to coarse grid cells reachable within the global look ahead depth, including the endpoint of neighboring coarse grid cells and the coarse grid cell in which the sensor is currently located. The endpoint of the current coarse grid cell may be included since it is possible that the local branch and bound function may not fully cover an individual coarse grid cell, especially when many sensors are included in the planning. However, it is possible to exclude the endpoint of the current coarse grid cell if this endpoint is reachable within the local look-ahead depth (also referred to as the local search distance).

Another fine grid cell may be added to the consideration of the global branch and bound function. Namely, the fine grid cell corresponding to the sensor's current position may be added. This potential move may be included to simulate running the local branch and bound function at the sensor's current position.

In the local branch and bound function, defining value and cost for each action is accomplished by obtaining g values from the results of executing a series of tangible moves. Defining the value and cost for each action in the global branch and bound function may be more challenging since it may be impractical to calculate the value of local search moves in the global planner. Therefore, the g and h values returned by moves in the global branch and bound function may be approximated.

In one embodiment, g is defined differently for the two types of moves available to the global branch and bound function. The two types of moves include moving to a neighboring coarse grid cell and staying in the current coarse grid cell. For moves to another global grid cell, g may be assumed to be zero. For the "move" of remaining in the current coarse grid cell (which may be considered simply as a "local search global move"), g is assigned a value according to equation 3, which is the h value of the local planner at the destination fine grid cell divided by $d_{local}$, where $d_{local}$ is the number of local moves needed to reach the destination fine grid cell.

$$g_{global} = \frac{c}{d_{local}} \sum_{i=1}^{d} \text{best}(G_d) \qquad \text{Eq. 3}$$

Following this approach, moves that involve traveling to an endpoint of neighboring coarse grid cells are assigned a value of 0, and a cost equal to the amount of time to travel to the endpoint. Moves within the current coarse grid (e.g., moves that result in instruction to the sensor 10 to use the local branch and bound function) are assigned a value equal to the heuristic value at the end point, or destination fine grid cell determined by the local planner, and a cost equal to the local look-ahead depth. As an example of this approach, Table 1 shows an action chain that contains six exemplary moves with individual action values and costs.

TABLE 1

| Move # | Action | Value | Cost |
|---|---|---|---|
| 1 | Move to neighboring cell's endpoint | 0 | 14 |
| 2 | Run local planner | 0.34 | 6 |
| 3 | Run local planner | 0.29 | 6 |
| 4 | Move to current cell's endpoint | 0 | 8 |
| 5 | Move to neighboring cell's endpoint | 0 | 12 |
| 6 | Run local planner | .36 | 6 |
| | TOTALS: | 1.09 | 52 |
| | | Ratio | 0.02096 |

Table 1 also includes totals for the values and costs, and a ratio of the total value to the total cost. This ratio may be compared against the current best set of actions in the branch and bound planning function to reach a deterministic solution.

In one embodiment, if the first action in the chain is a move to endpoint action, a command may be generated to instruct the corresponding sensor to undertake this global move action and a state of the sensor may be set to "decided." If the first action is a run local planner action, no command may be generated for the corresponding sensor and a state of the sensor may be set to or remain "undecided." Any sensors that are undecided after the global planner has finished executing will be included in the local planning process.

In one embodiment, if a sensor is commanded to carry out a global move, this sensor is removed from the planning process until it reaches the destination associated with the global move. This approach may minimize the occurrence of certain boundary issues that may arise when a sensor crosses the border of the current coarse grid cell to an adjacent grid cell. In this regard, the actions of these sensors may be considered to be fixed, but the results of their actions are still considered by any sensors that continue to be involved in the planning process. This may be accomplished by updating the probability map so that the information collection measurements that a sensor makes en route are applied as if the sensor has already moved to its final destination.

As indicated, the planning function(s) (e.g., the beginning branch and bound function, the PLB3 and/or the HLGBB, inclusive of global planning and/or local planning) may be carried out by the central control system 20. In this case, the central control system 20 may receive input data from each sensor 10 regarding sensor position and information collection measurements. The input data is used to plan the movements of each of the sensors 10. This plan is relayed to the sensors 10 as commands and, in response, the sensors 10 move in accordance with a next move command. Subsequent iterations of the movement planning may be made to generate additional next move commands that are transmitted to the sensors 10.

In another embodiment, the planning function(s) (e.g., the beginning branch and bound function, the PLB3 and/or the HLGBB, inclusive of global planning and/or local planning) may be carried out by one or more of the sensors 10. In one embodiment, each sensor carries out planning operations in coordination with the planning operations of the other sensors 10. Each sensor 10 may receive position and information collection measurement information from all of the other sensors 10 for use in movement planning. In such a fully networked system, each sensor 10 has a similar probability map of the AOI 14 and, therefore, will likely arrive at the same movement plan and each sensor 10 will individually be able to ascertain which move to undertake for itself. While this architecture is distributed in nature, each sensor 10 may carryout the same logical operations in parallel.

4. Example Simulations

Two simulation scenarios will be used to compare and contrast the various branch and bound techniques that are described in prior sections. The scenarios involve value maps and initial sensor positions, and include sensor movement capability (e.g., cardinal movements or ordinal movements).

Figure 7A:
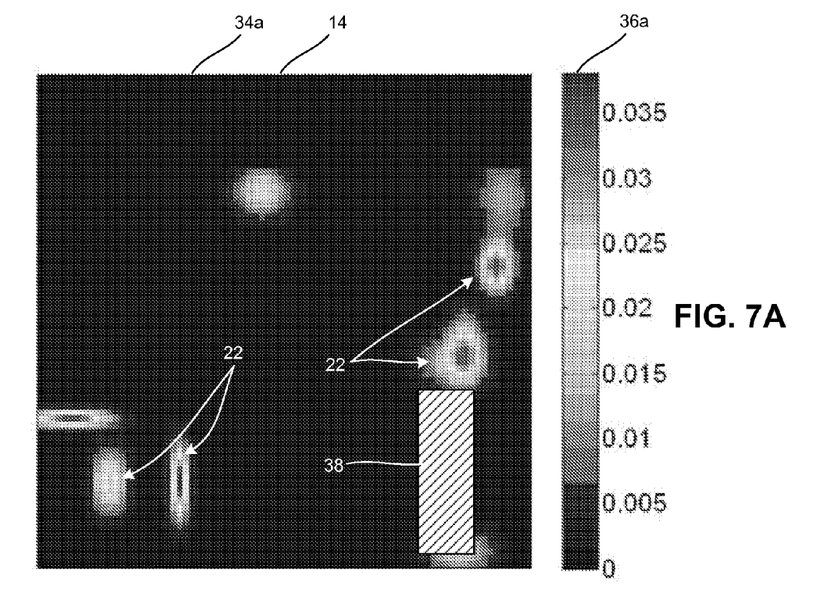
FIGS. 7A and 7B are representative initial probability maps for use in sensor planning simulations.

FIG. 7A illustrates an initial probability map 34a for an AOI 14 under a first exemplary scenario. The first scenario relates to an AOI 14 with a fine grid of 78 by 78 grid cells. The map 34a of FIG. 7A is constructed by assuming target 22 presence in certain grid cells and then generating a scaled Gaussian probability distribution around the center of those grid cells with a random variance. Large variances indicate uncertain target 22 positions. For illustration purposes, a scale 36a is depicted with the map. The scale 36a of the Gaussian indicates the likelihood of the presence of a target 22. The higher the value along the scale 36a, the more value that a grid cell may have. One or more areas in the value map 34a may have a zero value to represent a no-fly zone 38.

Figure 7B:
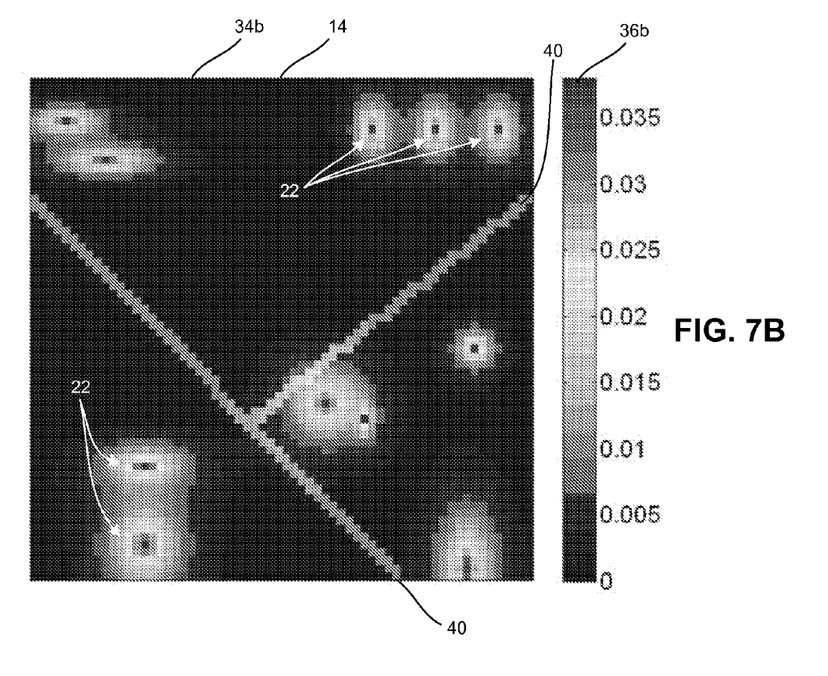

FIG. 7B illustrates an initial probability map 34b and scale 36b for an AOI 14 under a second exemplary scenario. The second scenario relates to an AOI 14 with a fine grid of 64 by 64 grid cells. The map 34a of FIG. 7A is constructed by assuming target 22 presence in certain grid cells and then generating a scaled exponential probability distribution around the center of those grid cells with a random variance. Large variances indicate uncertain target 22 positions. The scale 36b of the exponential indicates the likelihood of the presence of a target 22. The map 34b of the second scenario also contains lines 40 of relatively constant probability value. In this exemplary scenario, the lines 40 represent roads upon which ground traffic may travel. In the second scenario, any grid square below a predetermined threshold value has its value reduced to zero.

4(A). Simulation Results—Comparison of Beginning Branch and Bound and PLB3

As described, PLB3 is used to pass over (or "leapfrog") much of the time spent in determining the lower bound each time the branch and bound function is carried out. This allows a large portion of the tree to be pruned in the very first few iterations of the routine. The first exemplary scenario (FIG. 7A) was used in simulations to compare the performance of the beginning branch and bound function and the performance of the PLB3 function.

Figure 8:
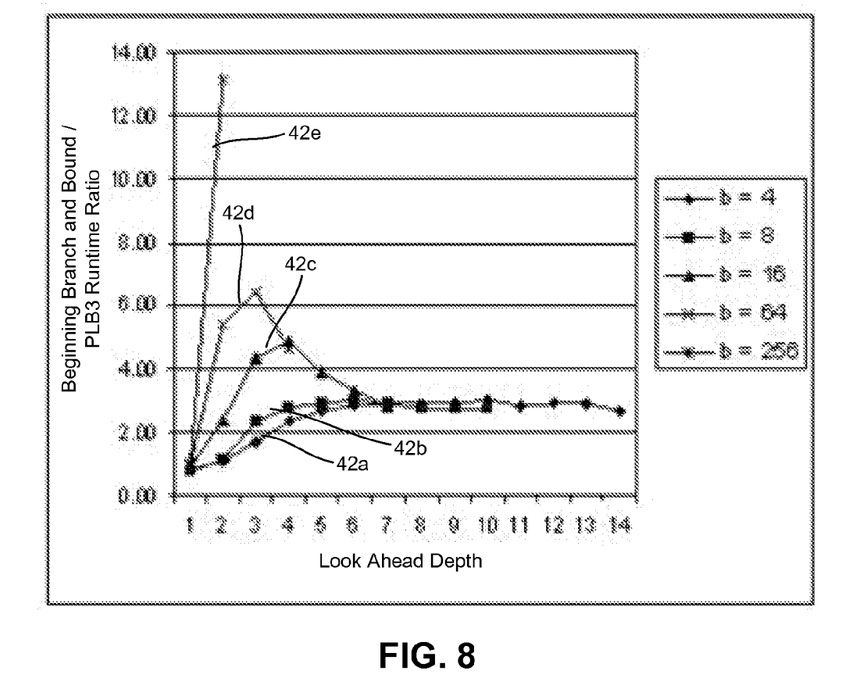
FIGS. 8, 9 and 10 are plots of performance under various simulations.

With additional reference to FIG. 8, illustrates are the performance results from these simulations. FIG. 8 is a graph that plots look ahead depth (x-axis) versus a runtime ratio of the beginning branch and bound function to the PLB3 function for several branching factors. In FIG. 8, curve 42a corresponds to a branching factor of 4, curve 42b corresponds to a branching factor of 8, curve 42c corresponds to a branching factor of 16, curve 42d corresponds to a branching factor of 64, and curve 42e corresponds to a branching factor of 256.

The curves of FIG. 8 show that the progressive lower bound of the PLB3 function reduces computational burden for look-ahead depths greater than one. At relatively large look ahead depths (e.g., greater than about seven), the improvement provided by the lower bound is slightly less than three. That is the PLB3 runs three times as fast as the beginning branch and bound function. Relatively large branching factors (e.g., sixteen or more) have a greater improvement in performance at look-ahead depths between two and six. Limited data points exist for the largest branching factors (e.g., 64 and 256) due to the large amount of computation time required. For instance, the runtime for a branching factor of 256 is on the order of days for a look-ahead depth of 3.

4(B). Simulation Results—Hybrid Local-Global Branch and Bound Algorithm (HLGBB)

Figure 9:
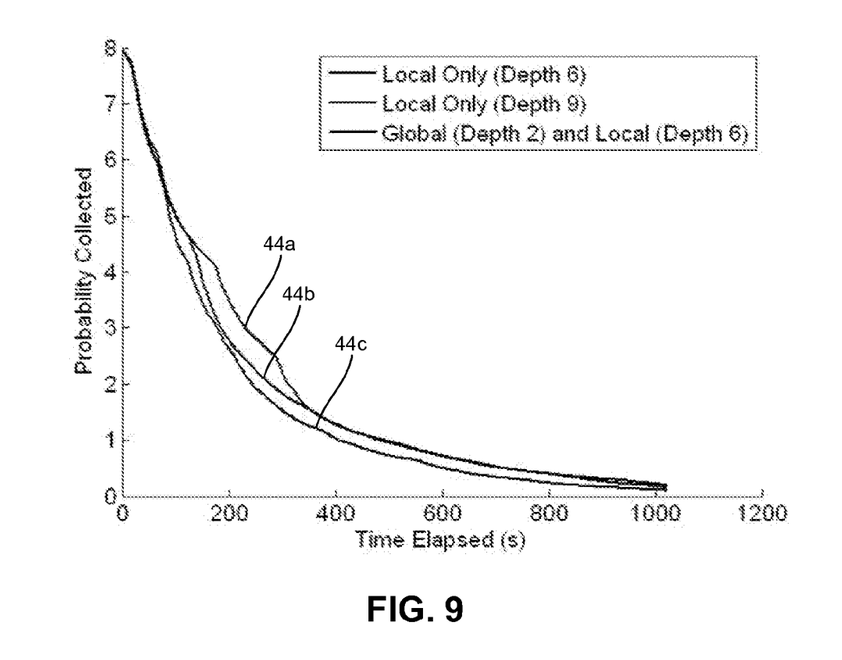

The HLGBB function and PLB3 function were simulated against each other. With additional reference to FIG. 9, shown is a plot of search entropy as a function of time for the execution of the PLB3 local planner with a look ahead depth of six (curve 44a), for the execution of the PLB3 local planner with a look ahead depth of nine (curve 44b), and for the execution of the two-tier HLGBB planner with local look ahead depth of six and global look ahead depth of two (curve 44c) that were carried out using the first exemplary scenario (FIG. 7A). Planning was made at one second intervals. Results of the simulation show that the HLGBB function is superior to the PLB3 function in optimizing the search objective function.

Figure 10:
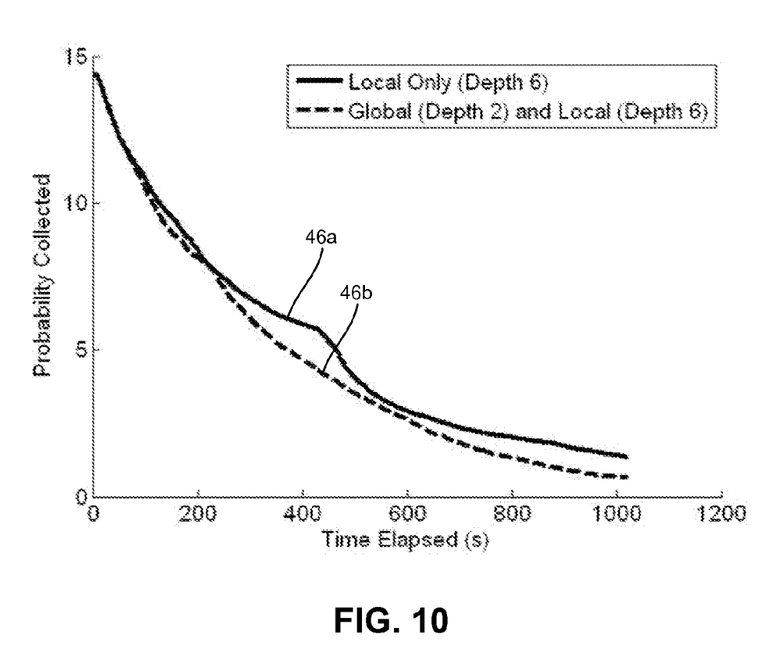

With additional reference to FIG. 10, shown is a plot of search entropy as a function of time for the execution of the PLB3 local planner with a look ahead depth of six (curve 46a), and for the execution of the two-tier HLGBB planner with local look ahead depth of six and global look ahead depth of two (curve 46b) that were carried out using the second exemplary scenario. Planning was made at one second intervals. Results of the simulation show that the HLGBB function is superior to the PLB3 function in optimizing the search objective function.

In addition, the HLGBB function used less computational resources than the PLB3 function.

4(C). Simulation Results—Network Loss

Various simulations were conducted to analyze the effects of loss of communication between groups of sensors 10. During the time of network loss, performance degraded. But following return of communications, system performance recovered so as to perform in close correlation to the performance of a control simulation where no network loss occurred.

4(D). Simulation Results—Prior Probability Map Mismatch

As will be appreciated, the initial probability map may not reflect the actual position or value of targets 22 in the AOI 14. Simulations were run to analyze the effect of a mismatch between actual conditions and initial probability maps.

Figure 11A:
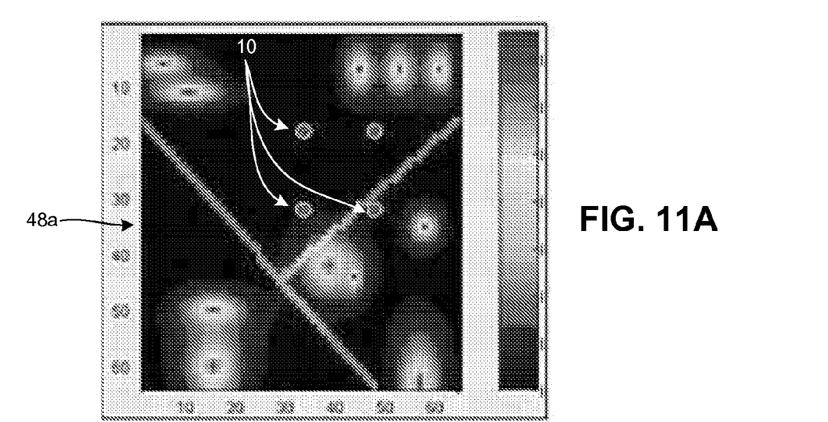
FIGS. 11A, 11B and 11C shown probability charts used in probability map mismatch simulations.
Figure 11B:
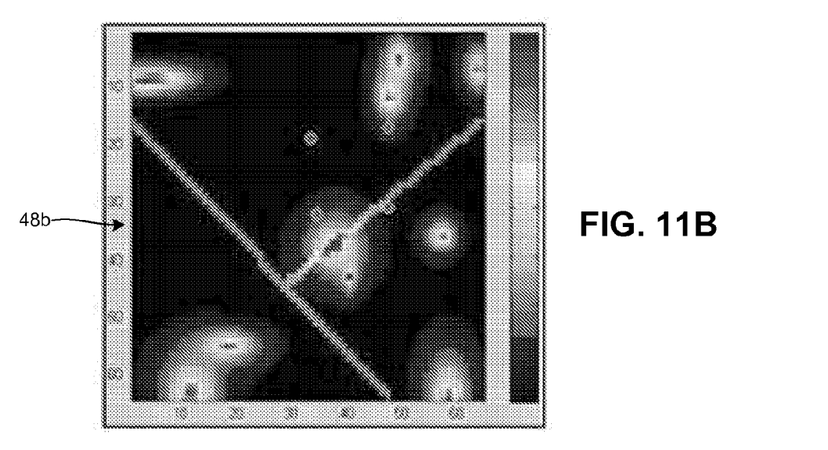
Figure 11C:
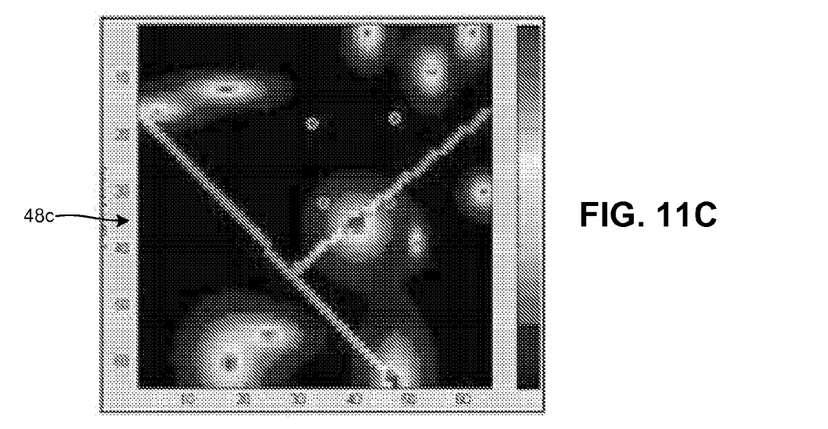

With additional reference to FIGS. 11A, 11B and 11C, illustrated are three probability maps 48 that are 64 by 64 grid cells. FIG. 11A represents an initial probability map 48a with ten local peaks representing the location of probable targets. The maps 48b and 48c of FIGS. 11B and 11C were generated by shifting the center of local probability map peaks in random directions with varying magnitudes. The magnitude for the map 48b of FIG. 11B is 5 grid cells (e.g., each peak is shifted by 5 grid cells relative to the map 48a) and the magnitude for the map 48c of FIG. 11C is 10 grid cells (e.g., each peak is shifted by 10 grid cells relative to the map 48a). The sigmas of the distributions are kept the same for purposes of the simulation.

Figure 12:
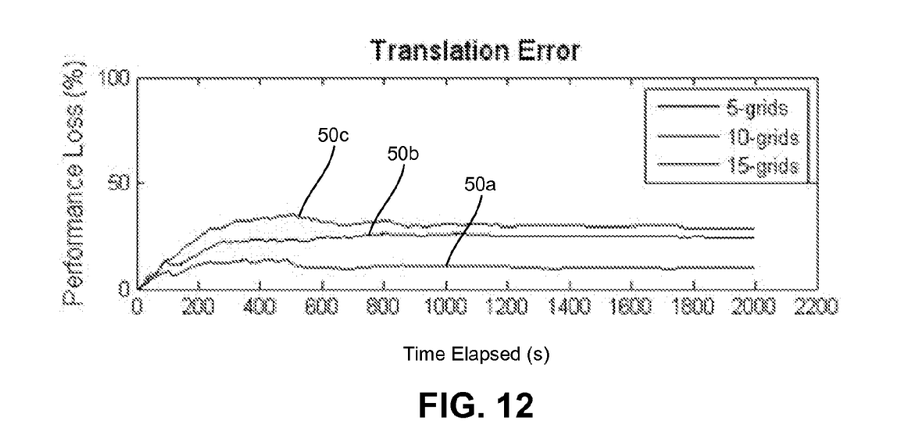
FIG. 12 is a plot of performance under the probability map mismatch simulation.

With additional reference to FIG. 12, shown is a plot of translation loss for three amounts of map mismatch errors. Planning was made at one second intervals. More specifically, curve 50a shows performance loss versus time for a shift magnitude of 5 grid cells, curve 50b shows performance loss versus time for a shift magnitude of 10 grid cells, and curve 50c shows performance loss versus time for a shift magnitude of 15 grid cells.

5. Conclusion

Although certain embodiments have been shown and described, it is understood that equivalents and modifications falling within the scope of the appended claims will occur to others who are skilled in the art upon the reading and understanding of this specification.

What is claimed is:
1. A method of planning sensor platform movement, comprising:
    dividing an area of interest into a grid of grid cells, each grid cell having a target probability and the sensor platform having a starting point corresponding to one of the grid cells;
    determining, via a computer system, a heuristic for the sensor platform by:
        iteratively searching a subset of the grid cells within incrementing respective search distances, from a search depth equal to one to a search depth defined by a look ahead depth, for a predetermined number of iterations defined by the look ahead depth,
        selecting, in each iteration, the grid cell having the highest target probability of the grid cells searched,
        logging the respective target probabilities of the selected grid cells and logging the respective search distances associated with the respective selected grid cells,
        wherein the search distance for the sensor platform in each iteration is measured from the starting point of the sensor platform, thereby ignoring feasibility of moves from the selected grid cell of one iteration to the selected grid cell of a subsequent iteration;
    determining, via the computer system, a current best path through the grid cells of the area of interest for a number of moves up to the look ahead depth;
    pruning, via the computer system, possible sensor platform movements by iterating a beginning branch and bound function for the predetermined number of steps in the look ahead depth, by comparing potential branches with the current best path, and eliminating potential branches that are not better than the current best path, wherein the potential branches each include a current node corresponding to the current step in the look ahead depth and ancestor and successor nodes collectively equal to the look ahead depth minus one, the current node having a value corresponding to a target probability of a feasible move, each ancestor node having a value corresponding to a target probability of a feasible move and each successor node having a value corresponding to a target probability of the heuristic; and
    tasking the sensor platform in accordance with the pruned possible sensor platform movements.

2. The method of claim 1, wherein the sensor platform is an unmanned aerial vehicle.

3. The method of claim 1, further comprising further pruning possible sensor platform movements by carrying out a progressive lower bound branch and bound function that includes determining an initial lower bound for the progressive lower bound branch and bound function by performing a greedy search of moves available from an end node of a predetermined path, adding a search value for corresponding movement resulting from the greedy search to a current cumulative search value for all predetermined movement steps in the look ahead depth and subtracting a search value for the first of the predetermined movement steps in the predetermined path.

4. The method of claim 3, wherein the predetermined path is a path planned in a previous iteration of a path planner using the method of claim 1.

5. A method of planning sensor platform movement, comprising:
dividing an area of interest into a grid of grid cells, each grid cell having a target probability and the sensor platform having a current starting point corresponding to one of the grid cells;
pruning possible sensor platform movements through the grid cells of the area of interest by carrying out a progressive lower bound branch and bound function by a computer that includes determining an initial lower bound for the progressive lower bound branch and bound function by performing a greedy search of moves available from an end node of a predetermined path, adding a search value for corresponding movement resulting from the greedy search to a current cumulative search value for all predetermined movement steps in the predetermined path and subtracting a search value for the first of the movement steps in the predetermined path; and
tasking the sensor platform in accordance with the pruned possible sensor platform movements.

6. The method of claim 5, wherein the predetermined path is determined using a heuristic, the heuristic being determined by:
iteratively searching a subset of grid cells within incrementing respective search distances, from a search depth equal to one to a search depth defined by a look ahead depth, for a predetermined number of iterations defined by the look ahead depth,
selecting, in each iteration, the grid cell having the highest target probability of the grid cells searched,
logging the respective target probabilities of the selected grid cells and logging the respective search distances associated with the respective selected grid cells,
wherein the search distance for the sensor platform in each iteration is measured from a then-current starting point of the sensor platform, thereby ignoring feasibility of moves from the selected grid cell of one iteration to the selected grid cell of a subsequent iteration.

7. The method of claim 5, wherein the sensor platform is an unmanned aerial vehicle.

8. A method of planning sensor platform movement, comprising:
dividing an area of interest into a first grid covering the extent of the area of interest, the first grid being a coarse grid of coarse grid cells;
dividing the area of interest into a second grid covering the extent of the area of interest, the second grid being a fine grid of fine grid cells, the area of each fine grid cell being smaller than the area of each coarse grid cell;
determining a gross movement path from a starting point to an ending point in a coarse grid cell through the coarse grid cells by carrying out via a computer a global branch and bound function using a global search depth on the coarse grid; and
determining an exact movement path from the starting point to the ending point in the coarse grid cell through the fine grid cells by carrying out via the computer a local branch and bound function using a local search depth on the fine grid, wherein the fine grid cells considered by the local branch and bound function are reachable within the local search depth from a path of fine grid cells through which the gross movement path traverses; and
tasking the sensor platform in accordance with the exact movement path.

9. The method of claim 8, wherein the sensor platform is an unmanned aerial vehicle.

10. The method of claim 8, wherein a ratio of the number of coarse grid cells to the number of fine grid cells is about 1:4 to about 1:10.

11. The method of claim 8, wherein each coarse grid cell reachable in the look ahead depth has a target probability that is determined as a target probability of a fine grid cell corresponding to an endpoint of the coarse grid cell, the endpoint being a destination for a move to the coarse grid cell.

12. The method of claim 11, wherein the endpoint is determined using local branch and bound planning for the fine grid cells in the coarse grid cell.

13. The method of claim 8, wherein for the sensor platform, the global branch and bound function considers coarse grid cells reachable within the global look ahead depth, including the coarse grid cell in which the sensor platform is currently located.

14. The method of claim 13, wherein the global branch and bound function further considers the fine grid cell corresponding to the current position of the sensor platform.

15. The method of claim 8, wherein the global branch and bound function includes pruning possible sensor platform movements by iterating a beginning branch and bound function for the global look ahead depth and using a heuristic for the sensor platform by:
iteratively searching a subset of grid cells within incrementing respective search distances, from a search depth equal to one to a search depth defined by a look ahead depth, for a predetermined number of iterations defined by the look ahead depth,
selecting, in each iteration, the grid cell having the highest target probability of the grid cells searched,
logging the respective target probabilities of the selected grid cells and logging the respective search distances associated with the respective selected grid cells,
wherein the search distance for the sensor platform in each iteration is measured from a starting point of the sensor platform, thereby ignoring feasibility of moves from the selected grid cell of one iteration to the selected grid cell of a subsequent iteration.

16. The method of claim 15, wherein the global branch and bound function further prunes possible sensor platform movements by carrying out a progressive lower bound branch and bound function that includes determining an initial lower bound for the progressive lower bound branch and bound function by performing a greedy search of moves available from an end node of a predetermined global path, adding a search value for corresponding movement resulting from the greedy search to a current cumulative search value for all predetermined global movement steps in the global look ahead depth and subtracting a search value for the first of the predetermined global movement steps in the predetermined global path.

17. The method of claim 8, wherein the local branch and bound function includes pruning possible sensor platform movements by iterating a beginning branch and bound function for the local look ahead depth and using a heuristic for each sensor platform by:
   iteratively searching a subset of grid cells within incrementing respective search distances, from a search depth equal to one to a search depth defined by a look ahead depth, for a predetermined number of iterations defined by the look ahead depth,
   selecting, in each iteration, the grid cell having the highest target probability of the grid cells searched,
   logging the respective target probabilities of the selected grid cells and logging the respective search distances associated with the respective selected grid cells,
   wherein the search distance for the sensor platform in each iteration is measured from a starting point of the sensor platform, thereby ignoring feasibility of moves from the selected grid cell of one iteration to the selected grid cell of a subsequent iteration.

18. The method of claim 17, wherein the local branch and bound function further prunes possible sensor platform movements by carrying out a progressive lower bound branch and bound function that includes determining an initial lower bound for the progressive lower bound branch and bound function by performing a greedy search of moves available from an end node of a predetermined local path, adding a search value for corresponding movement resulting from the greedy search to a current cumulative search value for all predetermined local movement steps in the local look ahead depth and subtracting a search value for the first of the predetermined local movement steps in the predetermined local path.

19. The method of claim 8, further comprising
   estimating a cost and a value of a move between coarse grid cells;
   estimating a cost and a value of a search move within a coarse grid cell; and
   determining a gross movement path by maximizing a value-to-cost ratio of possible movement paths, wherein
   the value of a search move is estimated with a heuristic determined by iteratively searching fine grid cells within an incrementing fine search distance for a predetermined number of steps in a fine look ahead depth, the fine search distance for the sensor platform in each iteration is measured from one of a current fine grid cell location of the sensor platform or from a predetermined fine grid cell endpoint of a coarse grid cell, thereby ignoring feasibility of moves from iteration to iteration.

* * * * *